United States Patent [19]

Martens et al.

[11] Patent Number: 5,406,002
[45] Date of Patent: Apr. 11, 1995

[54] ZEOLITE CATALYST AND CATALYSED REACTIONS

[75] Inventors: Luc R. M. Martens, Meise; Georges M. K. Mathys, Bierbeek, both of Belgium

[73] Assignee: Exxon-Chemical Patents Inc., Linden, N.J.

[21] Appl. No.: 199,133

[22] PCT Filed: Sep. 2, 1992

[86] PCT No.: PCT/EP92/02065
§ 371 Date: Feb. 25, 1994
§ 102(e) Date: Feb. 25, 1994

[87] PCT Pub. No.: WO93/04775
PCT Pub. Date: Mar. 18, 1993

[30] Foreign Application Priority Data
Sep. 4, 1991 [GB] United Kingdom ............... 9118959

[51] Int. Cl.$^6$ ............................................. C07C 45/28

[52] U.S. Cl. ..................... 568/385; 568/342; 568/836; 568/910; 568/311

[58] Field of Search ............ 568/342, 385, 399, 8, 568/17, 311, 836, 910, 815

[56] References Cited

U.S. PATENT DOCUMENTS

| 4,209,469 | 6/1980 | Schulman | 568/17 |
| 4,482,757 | 11/1984 | Drake | 568/385 |
| 4,727,195 | 2/1988 | Drent | 568/342 |
| 4,753,912 | 6/1988 | Green | 568/8 |
| 5,021,607 | 6/1991 | Huybrechts | 568/385 |
| 5,126,491 | 6/1992 | Clerici et al. | 568/385 |
| 5,233,092 | 8/1993 | Zaosheng | 568/399 |
| 5,252,758 | 10/1993 | Clerici et al. | 568/385 |

*Primary Examiner*—James H. Reamer
*Attorney, Agent, or Firm*—John J. Mahon

[57] ABSTRACT

An organophosphine-treated titanium-containing zeolite is a catalyst for hydrocarbon oxidation.

8 Claims, No Drawings

ZEOLITE CATALYST AND CATALYSED REACTIONS

This invention relates to catalysts, more especially to a method of modifying catalysts, the modified catalysts themselves, and to an oxidation process using the catalysts produced by the method.

Zeolite catalysts of many types have been proposed for use in numerous chemical processes. Among such catalysts are catalysts based on silicon and titanium oxides and optionally other components.

U.S. Patent No. 3,329,481 describes a catalyst of the formula $$(D_{2/n}O)_w XO_2 (SiO_2)_y$$

where D is a monovalent or divalent metal, hydrogen or ammonium, n being the valency of D, w represents 0.5 to 4, X represents one or more of titanium, zirconium, and hafnium, and y represents from 1 to 15, preferably from 2 to 10.

U.S. Pat. No. 3,702,886 describes crystalline zeolites denoted ZSM-5, their manufacture, and their use as catalysts in a number of hydrocarbon conversions.

U.S. Pat. No. 4,061,724 describes silicalite, processes for its manufacture, and its x-ray diffraction pattern.

GB-A-2071071 describes porous crystalline synthetic materials of the formula $$x\, TiO_2 \cdot (1-x)SiO_2,$$

in which x is from 0.0005 to 0.04, and preferably from 0.01 to 0.025, which have a silicalite structure in which titanium is substituted for silicon.

In British Patent Application No. 2024790, silicalites modified by the inclusion in the structure of other oxides, inter alia titanium, are described, as are uses for the modified material as catalysts.

GB-A-2083816 and 2116974 describe similar materials and their uses as oxidation catalysts.

EP-A-226258 describes silicates containing titanium and iron, and their uses as catalysts in various organic reactions.

In EP-A-100119, there is described a process for epoxidation of olefinic compounds by $H_2O_2$ using as catalyst a titanium-containing zeolite of the formula given in GB-A-2071071. The X-ray diffraction pattern and infra-red spectrum of the zeolite are described, and the material is designated TS-1. In EP-A-230949, the proportion of undesired by-products in the epoxidation reaction is reduced by employing a TS-1 catalyst treated with a base.

In WO 90/05126 there is described the oxidation of saturated hydrocarbon chains using a titanium-containing silicalite catalyst with an infra-red absorption band at about 950cm$^{-1}$.

In EP-A-412596 there is described the oxidation of paraffins in the presence of a titanium silicalite.

A paper by M. Nakamura et al, Shokubai (Catalyst), Vol. 32 No. 2, 1990, 65th Catalyst Society of Japan meeting, Abstract No. B3, described the effect of treating a TS-1 catalyst with amines of varying molecular sizes on the catalyst's activity in olefin and paraffin oxidation reactions. It was noted that in the oxidation of n-hexane, addition of triethylamine terminated the reaction, while the addition of triphenylamine hardly affected the yield. In the oxidation of 2-hexene, triethylamine inhibited the reaction, whereas triphenylamine accelerated it. In the oxidation of cyclohexane, triphenylamine again increased the yield (no results being reported for triethylamine with this reaction).

The procedures described in WO 90/05126 and the Nakamura et al paper for the oxidation of paraffins, and saturated aliphatic chains in other molecules, e.g., alkyl aromatic compounds, have advantages over other methods for oxidizing saturated organic compounds to introduce functional groups. In particular, because the catalyst is not in the same phase as the reactants, separation is facilitated, and the catalyst is readily available.

However, the product yield, based on peroxide used, is in need of improvement, a substantial $H_2O_2$ proportion being decomposed to water and oxygen, and the conversion rate of alkane to alkanol and alkanone is poor.

It has now surprisingly been found that a titanium-silicon zeolite catalyst treated with an organophosphine is an effective oxidation catalyst.

The present invention accordingly provides a titanium-containing zeolite catalyst that has been treated with an organophosphine.

The invention further provides a process for the oxidation of a hydrocarbon using an organophosphine-treated titanium-containing zeolite catalyst.

The invention still further provides the use of an organophosphine-treated titanium-containing zeolite as a catalyst in the oxidation of a hydrocarbon.

Also provided by the invention is a method of modifying a titanium-containing zeolite catalyst by treatment with an organophosphine.

As titanium-containing zeolite catalyst to be treated, as described in more detail below, with the organophosphine there may be used any zeolite catalyst mentioned above that contains titanium.

In general, the catalyst precursors are crystalline synthetic materials comprising silicon and titanium oxides, advantageously one having an infra-red absorption band at about 960 cm$^{-1}$. The intensity of this band increases with increasing titanium content.

Advantageously, the zeolite catalyst precursor is one of the formula $$xTiO_2 \cdot (1-x)SiO_2,$$

in which x represents 0.0005 to 0.04, preferably from 0.01 to 0.025.

A suitable catalyst precursor may conveniently be prepared, as described in GB-A-2071071, by heating a mixture containing a source of silicon oxide, a source of titanium oxide, a nitrogen-containing organic base, water and, optionally, an alkali metal oxide source, separating the formed crystals from the reaction mixture, and calcining the separated crystals to form the catalyst precursor. The precursor may also be obtained as described by B. Kraushaar et al in Catalysis Letters 1 (1988), 81, by the dealumination of ZSM-5 (see U.S. Pat. No. 3,702,886) and reaction with titanium tetrachloride vapour. The precursor may also be obtained by impregnating a preformed titanium/silicon oxide coprecipitate with a templating agent, followed by hydrothermal synthesis, as described in EP-A-311983. As indicated above, the zeolite may contain small amounts of other metals, for example, boron, aluminium, gallium, and iron.

In the preferred method of preparation, following the procedure described in GB-A-2071071, the silicon oxide source may be, for example, a tetraalkylorthosilicate, e.g., tetraethylorthosilicate, a silicate in colloidal form, or a silicate of an alkali metal, preferably Na or K.

The titanium oxide source is advantageously a hydrolysable titanium compound, for example, $TiOCl_4$, $TiOCl_2$ or a $Ti(alkoxy)_4$, preferably $Ti(OC_2H_5)_4$.

The organic base is advantageously a tetraalkylammonium hydroxide, more especially tetrapropylammonium hydroxide.

In the preferred method of producing the catalyst recursor the reaction mixture is subjected to hydrothermal treatment in an autoclave at a temperature of between 130° and 200° C., preferably about 175° C., under its own developed pressure, for a time of 1 hour to 30 days, preferably 6 to 30 days, and most preferably about 10 days until crystals are formed. These are separated from the mother solution, carefully washed with water and dried. When in the anhydrous state they have the following composition:

$$xTiO_2 \cdot (1-x)SiO_2 \cdot 0.04(RN^+)_2O.$$

The crystals are then heated for between 1 and 72, preferably about 20, hours in air at 200° to 600° C., advantageously about 550° C., to eliminate the nitrogenated organic base.

The calcined catalyst precursor advantageously has the following composition:

$$xTiO_2 \cdot (1-x)SiO_2$$

where x is as hereinbefore defined.

The advantageous and preferred molar ratios (MR) of the different reactants relative to the silicon oxide source ($SiO_2$) are given in the following table:

|  | MR | MR (preferred) |
| --- | --- | --- |
| $TiO_2/SiO_2$ | 0.005–0.5 | 0.20 |
| $H_2O/SiO_2$ | 20–200 | 100 |
| $RN^+/SiO_2$ | 0.1–2.0 | 0.89 |

The catalyst may also contain alkali metal cations $M^+$ where M is sodium or potassium and if so it is preferred that the molar ratio of $M^+:SiO_2$ is in the range 0.001 to 0.5.

As organophosphine there is advantageously used a compound of the formula:

$$PR^1R^2R^3$$

in which $R^1$, $R^2$ and $R^3$, which may be the same or different, represent an aliphatic, aromatic, araliphatic or aliphatic aromatic group, more especially an alkyl, cycloalkyl, alkylcycloalkyl, cycloalkylalkyl, alkenyl, cycloalkenyl, aryl, alkaryl, aralkyl, alkenaryl, or aralkenyl group. Examples of such groups are butyl, cyclohexyl, neopentyl, and methyl, the last mentioned advantageously being used in conjunction with larger substituent groups. The above-mentioned hydrocarbon substituent groups may themselves be substituted, interrupted, or linked to the phosphorus atom, by atoms or groups that are themselves preferably relatively inert or stable under conditions of treatment of the catalyst precursor with the organophosphine modifier, or under the conditions of the reaction that the treated zeolite is to catalyse. As examples of suitable substituent groups or atoms, there may be mentioned amino groups.

Advantageously, each of $R^1$, $R^2$, and $R^3$ contains at least 3 carbon atoms, preferably at least 4 carbon atoms, and more preferably at least 6 carbon atoms.

The substituents are advantageously so chosen that the phosphine cannot enter the zeolite pores to any substantial extent; accordingly the minimum size of the phosphine substituents is dependent on this factor.

For a substituent of a given carbon number, a cyclic carbon chain is preferred; branched chains are less preferred, linear chains least preferred.

Also, but less preferred, there may be used an organophosphine of the formula:

$$PHR^1R^2 \text{ or } PH^2R^1$$

in which $R^1$ and $R^2$, which may be the same or different, have the meanings given above, subject to the proviso indicated above about the compound's not entering the zeolite pores.

Mixtures of two or more organophosphines may be employed.

Suitable phosphines include tri(diethylamino) phosphine and, advantageously, tributylphosphine and tricyclohexylphosphine.

Advantageously, the phosphine has a pKa in the range of from 6 to 12, preferably from 8.4 to 11.9. Suitable phosphines are commercially available.

The zeolite may be treated with the organophosphine during or, preferably, before the catalysed reaction, in order that the organophosphine is not oxidized before it can react with the catalyst precursor.

If the treatment takes place before the catalysed reaction, it may be carried out, for example, by forming a slurry of the zeolite (catalyst precursor) in a solution of the phosphine in a suitable solvent and stirring the slurry at a temperature, for example, within the range of from room temperature to the boiling point of the solvent for a time in the range of from 1 to 60, preferably 10 to 30, minutes. As solvent there may be mentioned, for example, alcohols, e.g., methanol or t-butanol, and ketones, e.g., acetone. The feed molecule for the catalysed reaction may in suitable cases act as solvent. The phosphine is advantageously employed at a concentration, based on the weight of zeolite, of from 0.01 to 5 weight %, preferably from 0.2 to 3% by weight.

Alternatively, the catalyst precursor may be treated with the organophosphine by incorporating it in the feedstock to the reaction being catalysed, and/or the proportion of organophosphine in the catalyst may be maintained by a similar procedure, the organophosphine being present in the feedstock at a concentration, for example, of 0.005 to 0.5 mole phosphine per mole of hydrocarbon.

The organophosphine-treated titanium-containing zeolite may be employed as a catalyst for a variety of oxidation reactions, especially those carried out using a peroxide, more especially an organic peroxide, hydrogen peroxide or a material that yields hydrogen peroxide under the reaction conditions. As examples of such reactions there may be mentioned:

hydroxylation of aromatic hydrocarbons
synthesis of glycol ethers by reaction of an olefinic compound, methanol and hydrogen peroxide
epoxidation of olefinic compounds
oxidation of alcohols to aldehydes or ketones
epoxidation of di-olefines
oxidation of saturated hydrocarbon chains The catalyst is especially suitable for use in the oxidation of saturated hydrocarbon groups, either in aliphatic compounds, or aliphatic substituents of aliphatic-/aromatic compounds. The saturated hydrocarbon groups include alkanes advantageously containing at least 3, more especially from 3 to 18, and preferably from 3 to 12 carbon atoms. The chains may be linear, branched, or cyclic, and preferably include at least one secondary or tertiary carbon atom. The groups also include alkyl, including cycloalkyl, substituents on a mono or polyalkylaromatic compound in which at least one alkyl group advantageously contains at least 2, preferably at least 3, more preferably 3 to 18, most preferably 3 to 12 carbon atoms, and mono- and polyalkyl cyclic alkanes. It has surprisingly been found that by the selection of appropriate conditions the saturated groups may be oxidized with high selectivity to alcohols and ketones under relatively mild conditions. One particularly useful application is in the oxidation of linear and branched paraffins to secondary alcohols and ketones. The process is especially useful in the lower carbon range, facilitating the use of low-cost propane and butane feedstock in the manufacture of isopropanol, acetone, secondary butyl alcohol and methyl ethyl ketone. The aliphatic substituent may be a part of a totally aliphatic substituent compound (alkylaromatic) or an alkylnaphthene compound. Furthermore, the compound may contain other functional groups which have electron-repulsive properties and which, accordingly, are not reactive.

For aliphatic compounds, the reactivity reduces from tertiary to secondary to primary compounds.

The oxidizing agents used in oxidizing saturated hydrocarbons may be organic peroxides, ozone or hydrogen peroxide, aqueous hydrogen peroxide being preferred. The aqueous solution advantageously contains from 10 to 100, preferably 10 to 70 wt %, hydrogen peroxide, for example dilute hydrogen peroxide (e.g., 30% by weight in water).

Particular advantages of the present invention are that the process uses mild temperature and pressure conditions and the conversion and yield are high and byproduct formation is low. In particular the yield of oxidized hydrocarbon, based on the consumption of hydrogen peroxide which is relatively expensive, is high.

Advantageously, the reaction temperature is between 50° and 150° C., preferably about 100° C.

The reaction may be carried out at room temperature but higher reaction rates may be achieved at higher temperatures, for example under reflux conditions. Through increase of the pressure either due to the autogenous pressure created by the heated reactants or by use of a pressurized reactor still higher temperatures can be reached. The pressure is advantageously such that all materials are in the liquid or dense phase. Pressures in the range of 1 to 100 bars ($10^5$ to $10^7$ Pa) may be employed.

The oxidation reaction may be carried out under batch conditions or in a fixed bed, although the use of the heterogeneous catalyst facilitates a continuous reaction in a monophase or biphase system. The catalyst is stable under the reaction conditions, and may be totally recovered and reused.

The oxidation process is preferably carried out in the presence of a solvent. The solvent should advantageously render miscible the organic phase and the aqueous phase which is generally present as a result of the use of aqueous hydrogen peroxide as the oxidizing agent. Polar solvents are preferred, for example, alcohols, ketones, ethers and glycols, advantageously having a relatively low number of carbon atoms, preferably less than or equal to 6. Methanol and tertiary butanol are the most preferred of the alcohols, acetone the most preferred of the ketones. The proportion of solvent may influence the reaction product and the conversion, the choice of solvent and the quantity depending on the material to be oxidized. For example, when oxidizing alkanes with aqueous hydrogen peroxide good yields are obtained when the ratio of acetone solvent to alkane reactant is in the weight range 1:1 to 4:1.

The solvent may be omitted if sufficient contact between the feed, catalyst, and oxidizing agent may be achieved in its absence, e.g., by vigorous stirring.

The following Examples illustrate the invention:

EXAMPLE A

Preparation of the catalyst precursor 15 g of tetraethylorthotitanate are slowly dropped with stirring into 250 ml of distilled water. The white suspension produced was cooled to 2° C., whereafter 180 ml of a 30% by weight solution of hydrogen peroxide in water were added whilst cooling to maintain the temperature at 2° C. The mixture was stirred at this low temperature for 2 hours. Thereafter, 250 ml of a 25% by weight solution in water of tetrapropylammonium hydroxide containing sodium ions as impurity were added, forming a clear orange solution. After one hour, 50 g of a 40% by weight colloidal silica solution (Ludox Type SA 40) were added and the mixture left at room temperature overnight. Finally, the whole was heated to 70° to 80° C. for 6 to 7 hours with stirring. The yellow solution was then transferred into an autoclave and maintained at 175° C. for 10 days. The autoclave was thereafter cooled to room temperature and the formed crystals were separated by filtration from the mother-liquor, washed with distilled water and centrifuged. The product was dried and calcined at 550° C. in air for 20 hours.

EXAMPLE 1

1 g of catalyst precursor prepared as described in Example A was introduced into a 130 ml autoclave and 2.05 g (10 mmol) of tributylphosphine, 20 g (0.20 mol) n-heptane, 13.6 g (0.40 mol) $H_2O_2$ in the form of 30% aqueous solution, and 70 g acetone were added. The autoclave was sealed, and the reaction mixture heated to 100° C. and maintained at that temperature with stirring for 3 hours. The autoclave was then rapidly cooled to room temperature, and the contents analysed by gas chromatography and mass spectroscopy. The results are shown in the Table below, together with those of Examples 2 and 3 and the Comparative Examples.

EXAMPLE 2

The procedure of Example 1 was repeated, using as organophosphine tricyclohexylphosphine, 2.80 g (10 mmol).

EXAMPLE 3

The procedure of Example 2 was repeated, but using 0.29 g (1 mmol) of tricyclohexylphosphine.

COMPARATIVE EXAMPLE B

The procedure of Example 1 was repeated, with no addition of organophosphine.

COMPARATIVE EXAMPLE C

The procedure of Example 2 was repeated, but using 1.11 g (10 mmol) of quinuclidine, instead of an organophosphine.

COMPARATIVE EXAMPLE D

The procedure of Example C was repeated, but using 1.12 g (10 mmol) of diazabicyclooctane.

COMPARATIVE EXAMPLE E

The procedure of Example C was repeated, but using 2.45 g (10 mmol) of triphenylamine.

| Example | Conversion of heptane % | Selectivity Product (heptan-) weight % | | | | | |
|---|---|---|---|---|---|---|---|
| | | 4-one | 3-one | 2-one | 4-ol | 3-ol | 2-ol |
| 1 | 57.6 | 3.54 | 16.12 | 43.64 | 7.92 | 18.23 | 10.56 |
| 2 | 73.3 | 4.92 | 19.78 | 45.85 | 7.67 | 14.69 | 7.09 |
| 3 | 68.1 | 4.75 | 18.79 | 46.21 | 7.47 | 14.98 | 7.80 |
| B | 52.9 | 4.46 | 18.02 | 42.97 | 7.01 | 16.19 | 11.36 |
| C | 14.9 | 4.05 | 14.17 | 16.30 | 10.74 | 32.83 | 21.92 |
| D | 33.1 | 4.06 | 16.00 | 29.30 | 9.34 | 24.17 | 17.14 |
| E | 59.8 | 4.27 | 17.70 | 42.02 | 8.23 | 17.86 | 9.92 |

We claim:

1. A process for the oxidation of a hydrocarbon using a catalyst consisting essentially of an organophosphine-treated titanium-containing zeolite wherein the zeolite is of the formula $x\,TiO_2 \cdot (1-x)SiO_2$ where x is from 0.0001 to 0.04 and the organophosphine is of the formula $PR^1R^2R^3$ where $R^1$, $R^2$ and $R^3$ are the same or different and represent an aliphatic, aromatic, aralphatic or aliphatic-aromatic group which may be substituted, interrupted or linked to the phosphorus atom by hetero atoms or groups.

2. The process of claim 1 wherein the hydrocarbon is an alkane of 3 to 18 carbon atoms.

3. The process of claim 1 where the hydrocarbon contains a cyclic structure having an alkyl substituent having at least 2 carbon atoms.

4. The process of claims 1, 2, or 3 where the oxidation is carried out using hydrogen peroxide or an organic peroxide.

5. The process of claim 1 where each of $R^1$, $R^2$ and $R^3$ contain at least 3 carbon atoms.

6. The process of claim 5 where each of $R^1$, $R^2$ and $R^3$ is a cycloaliphatic group.

7. The process of claim 6 where $R^1$, $R^2$ and $R^3$ are each cyclohexyl.

8. The process of claim 1 where the zeolite has an infra-red absorption band at about 960 $cm^{-1}$.

* * * * *